United States Patent
Sheoran et al.

(10) Patent No.: US 7,600,714 B2
(45) Date of Patent: Oct. 13, 2009

(54) DIFFUSING AIR INLET DOOR ASSEMBLY

(75) Inventors: Yogendra Y. Sheoran, Scottsdale, AZ (US); Joseph W. Michalski, Jr., Valley View, OH (US); Kyle D. Asplund, Wichita, KS (US)

(73) Assignee: Honeywell International Inc., Morristown, NJ (US)

( * ) Notice: Subject to any disclaimer, the term of this patent is extended or adjusted under 35 U.S.C. 154(b) by 442 days.

(21) Appl. No.: 11/409,360

(22) Filed: Apr. 20, 2006

(65) Prior Publication Data

US 2007/0246607 A1    Oct. 25, 2007

(51) Int. Cl.
*B64D 33/02* (2006.01)
(52) U.S. Cl. .................................... 244/53 B
(58) Field of Classification Search ............ 454/70–76; 244/58, 53 B; 137/15.1, 15.2
See application file for complete search history.

(56) References Cited

U.S. PATENT DOCUMENTS

| | | | | |
|---|---|---|---|---|
| 2,932,945 | A * | 4/1960 | Brandt, Jr. ................ | 138/40 |
| 3,041,827 | A * | 7/1962 | Ferri ....................... | 138/40 |
| 3,169,728 | A * | 2/1965 | Messerschmitt et al. .. | 244/23 R |
| 3,222,863 | A | 12/1965 | Klees et al. | |
| 3,540,221 | A * | 11/1970 | Bouiller et al. ........... | 60/244 |
| 3,568,694 | A * | 3/1971 | Johnson .................. | 137/15.1 |
| 3,659,424 | A * | 5/1972 | Polk, Jr. .................. | 60/269 |
| 4,121,606 | A | 10/1978 | Holland et al. | |
| 4,307,743 | A * | 12/1981 | Dunn ..................... | 137/15.1 |
| 4,418,879 | A | 12/1983 | Vanderleest | |
| 4,474,344 | A | 10/1984 | Bennett | |
| 5,082,206 | A | 1/1992 | Kutschenreuter, Jr. et al. | |
| 5,655,359 | A | 8/1997 | Campbell et al. | |
| 5,697,394 | A * | 12/1997 | Smith et al. ............. | 137/15.1 |
| 5,906,334 | A | 5/1999 | Charnay et al. | |
| 5,971,000 | A | 10/1999 | Koncsek et al. | |
| 6,050,527 | A * | 4/2000 | Hebert et al. ............ | 244/210 |
| 6,082,669 | A * | 7/2000 | Bardagi et al. .......... | 244/53 B |
| 6,092,360 | A | 7/2000 | Hoag et al. | |

(Continued)

FOREIGN PATENT DOCUMENTS

EP    1327581 A2    7/2003

(Continued)

OTHER PUBLICATIONS

EP Search Report 07106479.4-2422 dated May 8, 2009.

*Primary Examiner*—Michael R Mansen
*Assistant Examiner*—Joseph W Sanderson
(74) *Attorney, Agent, or Firm*—Ingrassia Fisher & Lorenz, P.C.

(57) ABSTRACT

An inlet door assembly for reducing air pressure loss and enhancing performance of an auxiliary power unit (APU) contained within an aircraft housing is provided. The inlet door assembly includes a duct and a diffuser. The duct, which is configured to be movably coupled to an aircraft and to move between open and closed positions, has a flow passage extending therethrough. Air external to the aircraft flows through the duct while it is in the open position, but not while it is in the closed position. The diffuser is coupled to the duct and configured to move therewith. The diffuser has a passage extending therethrough that is in fluid communication with the duct flow passage, and is configured to diffuse the air that flows therethrough.

21 Claims, 4 Drawing Sheets

U.S. PATENT DOCUMENTS

| | | | |
|---|---|---|---|
| 6,142,417 A * | 11/2000 | Figge, Sr. | 244/53 B |
| 6,247,668 B1 * | 6/2001 | Reysa et al. | 244/58 |
| 6,264,137 B1 | 7/2001 | Sheoran | |
| 6,272,838 B1 | 8/2001 | Harvell et al. | |
| 6,293,494 B1 | 9/2001 | Scherer et al. | |
| 6,349,899 B1 | 2/2002 | Ralston | |
| 6,520,738 B2 | 2/2003 | Sheoran et al. | |
| 6,634,597 B2 | 10/2003 | Johnson et al. | |
| 6,651,929 B2 * | 11/2003 | Dionne | 244/57 |
| 6,901,737 B2 | 6/2005 | Schnoor | |
| 6,942,181 B2 | 9/2005 | Dionne | |
| 7,014,144 B2 * | 3/2006 | Hein et al. | 244/53 B |
| 7,344,107 B2 * | 3/2008 | Campbell et al. | 244/58 |
| 2003/0132344 A1 | 7/2003 | Johnson et al. | |
| 2006/0196993 A1 * | 9/2006 | Hein et al. | 244/53 B |

FOREIGN PATENT DOCUMENTS

| | | |
|---|---|---|
| GB | 2106595 A | 4/1983 |

* cited by examiner

DIFFUSING AIR INLET DOOR ASSEMBLY

TECHNICAL FIELD

The present invention generally relates to aircraft inlet doors, and, more particularly, inlet door assemblies for enhancing performance of auxiliary power units and/or cooling systems.

BACKGROUND

Auxiliary power units ("APU") are used in aircraft to provide electrical power and compressed air to various parts therein. When an aircraft is on the ground, its main source of electrical power and pneumatic power comes from the APU often when the main engines are not operating. In particular, the APU can power the environmental control systems, air drive hydraulic pumps, and the starters for the main engines. When an aircraft is in flight, the APU may also provide pneumatic and/or electric power to the aircraft.

Typically, APUs are located in the aft section of the aircraft, at or near the tailcone section, and utilize an air intake system to allow sufficient air flow to travel from an opening in the exterior surface of the airplane through to the APU. Air intake systems typically include an inlet air door to protect the APU from foreign object damage when not in use and/or during ground movement, and to maximize airflow into the APU when performance at altitude is required. Thus, when APU venting is desired, the inlet air door opens, either on the ground or in flight.

Air intake systems also typically include passageways whereby the air entering through the inlet door flows to the APU for use by the APU. Air intake systems using air inlet plenums are often preferred over traditional duct systems as providing increased APU performance and decreased noise from the APU system.

However, when the air inlet plenum and the opening in the exterior surface of the aircraft are in close proximity to one another (as is often the case with small and medium size aircraft), there are often significant air pressure losses associated with the sudden area changes at the interface.

Therefore, there is a need for an air intake assembly that can deliver air into the plenum while minimizing the pressure losses associated with the sudden area changes.

BRIEF SUMMARY

An apparatus is provided for an inlet door assembly for an aircraft auxiliary power unit. The inlet door assembly includes a duct and a diffuser. The duct has a flow passage extending therethrough, and is movably coupled to an aircraft. The duct is configured to move between an open position, in which air external to the aircraft flows through the duct flow passage, and a closed position, in which air external to the aircraft does not flow through the duct flow passage. The diffuser is coupled to the duct and configured to move therewith. The diffuser has a passage extending therethrough that is in fluid communication with the duct flow passage, and is configured to diffuse the air that flows therethrough.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
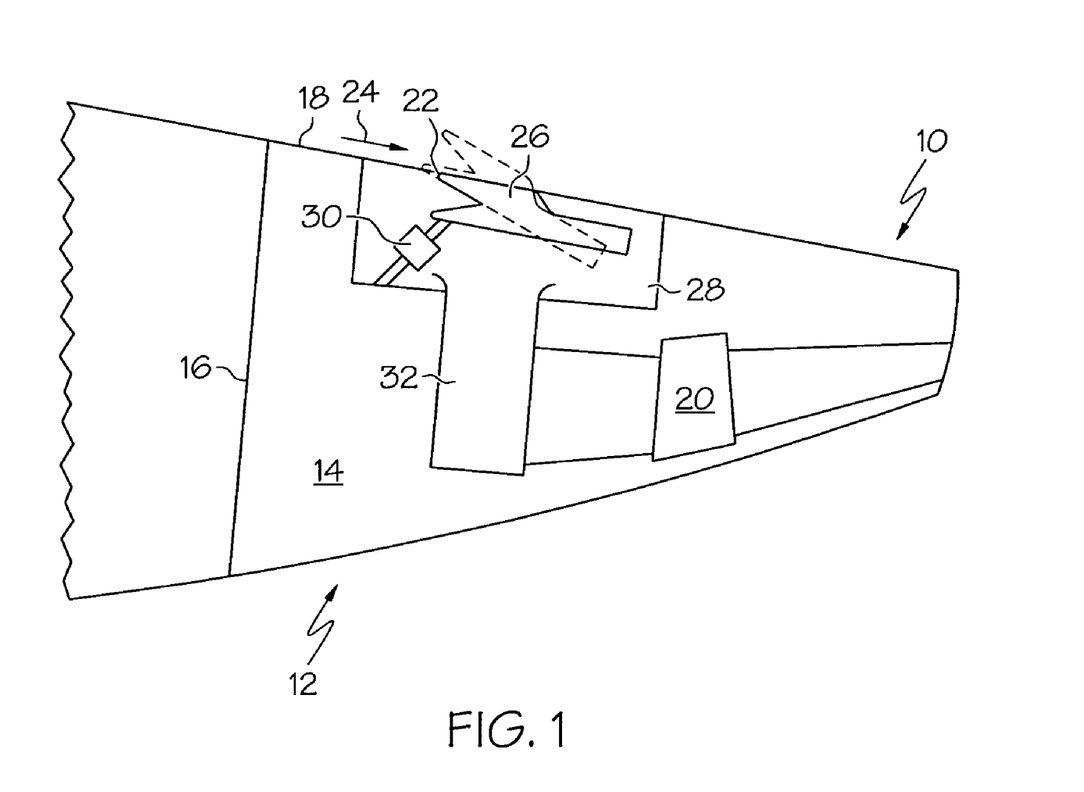
FIG. 1 is a cross-sectional schematic representation of a tailcone section of an aircraft showing an inlet door assembly, plenum and auxiliary power unit (APU) inside the tailcone.

FIG. 1 depicts a cross-sectional schematic representation of a tailcone section 10 of an aircraft fuselage 12. The tailcone section 10 includes a compartment 14 that is defined by a firewall 16 and an exterior surface 18 of the aircraft fuselage 12, and within which an auxiliary power unit (APU) 20 is disposed. The firewall 16, as is generally known, separates the compartment 14 from other sections of the aircraft fuselage 12, and provides a fire resistant barrier in the highly unlikely event of a fire in the compartment 14.

The exterior surface 18 of the aircraft fuselage 12 has an intake opening 22 formed therethrough. The intake opening 22 allows air 24 external to the aircraft fuselage 12 to be supplied to the APU 20, via an inlet door assembly 26 and a plenum 28. The inlet door assembly 26 is movably coupled to the aircraft fuselage 12. It will be appreciated that the inlet door assembly 26 may be mounted or otherwise coupled to the aircraft fuselage 12 using any one of numerous different coupling techniques. For example, the inlet door assembly 26 may be mounted using revolute joints or a linkage system, as disclosed in U.S. Pat. No. 6,349,899 or U.S. Pat. No. 4,418,879, respectively, just to name a few.

No matter the particular technique that is used to couple the inlet door assembly 26 to the aircraft fuselage 12, the inlet door assembly 26 is configured to be moveable, preferably via one or more actuator assemblies 30, between an open position (shown in phantom in FIG. 1), in which the external air 24 external flows through the intake opening 22, via the inlet door assembly 26, and a closed position (shown in solid lines in FIG. 1), in which the external air 24 does not flow through the intake opening 22. More specifically, and as will be described further below, when the inlet door assembly 26 is in the open position, the external air 24 flows into and through the inlet door assembly 26, where it is diffused and discharged into the plenum 28.

The plenum 28 surrounds the intake opening 22, and receives the diffused external air 24 that is discharged from the inlet door assembly 26. It will also be appreciated that the plenum 28 can take any number of different forms, and can be defined by any number of existing walls, structures or material in the compartment 14, any new walls, structures or material, or any portions or combinations thereof. The plenum 28 maintains the external air 24 at a substantially constant static pressure, and is in fluid communication with the APU 20. Thus, during operation, the APU 20 draws the external air 24 from the plenum 28. It will be appreciated that the plenum 28 may be in fluid communication with the APU 20 using any number of different techniques so as to allow the flow of the external air 24 from the plenum 28 into the APU 20. In the depicted embodiment, however, this fluid communication is provided by an APU inlet duct 32 that is coupled between the plenum 28 and the APU 20.

Before proceeding further it is noted that although the intake opening 22 and the inlet door assembly 26 are depicted in FIG. 1 as being positioned on a top portion of the aircraft fuselage 12, a person of skill in the art will appreciate that the intake opening 22 and the inlet door assembly 26 may be located at any one of numerous other locations on the aircraft fuselage 12. It will additionally be appreciated that the various components described above can be placed in different portions of the compartment 14 and/or the aircraft fuselage 12. The inlet door assembly 26 may also be placed in numerous other locations on the tailcone 10 to provide cooling air to the compartment 14, or in numerous other locations on the aircraft to provide cooling air to any one of numerous other compartments.

Figure 2:
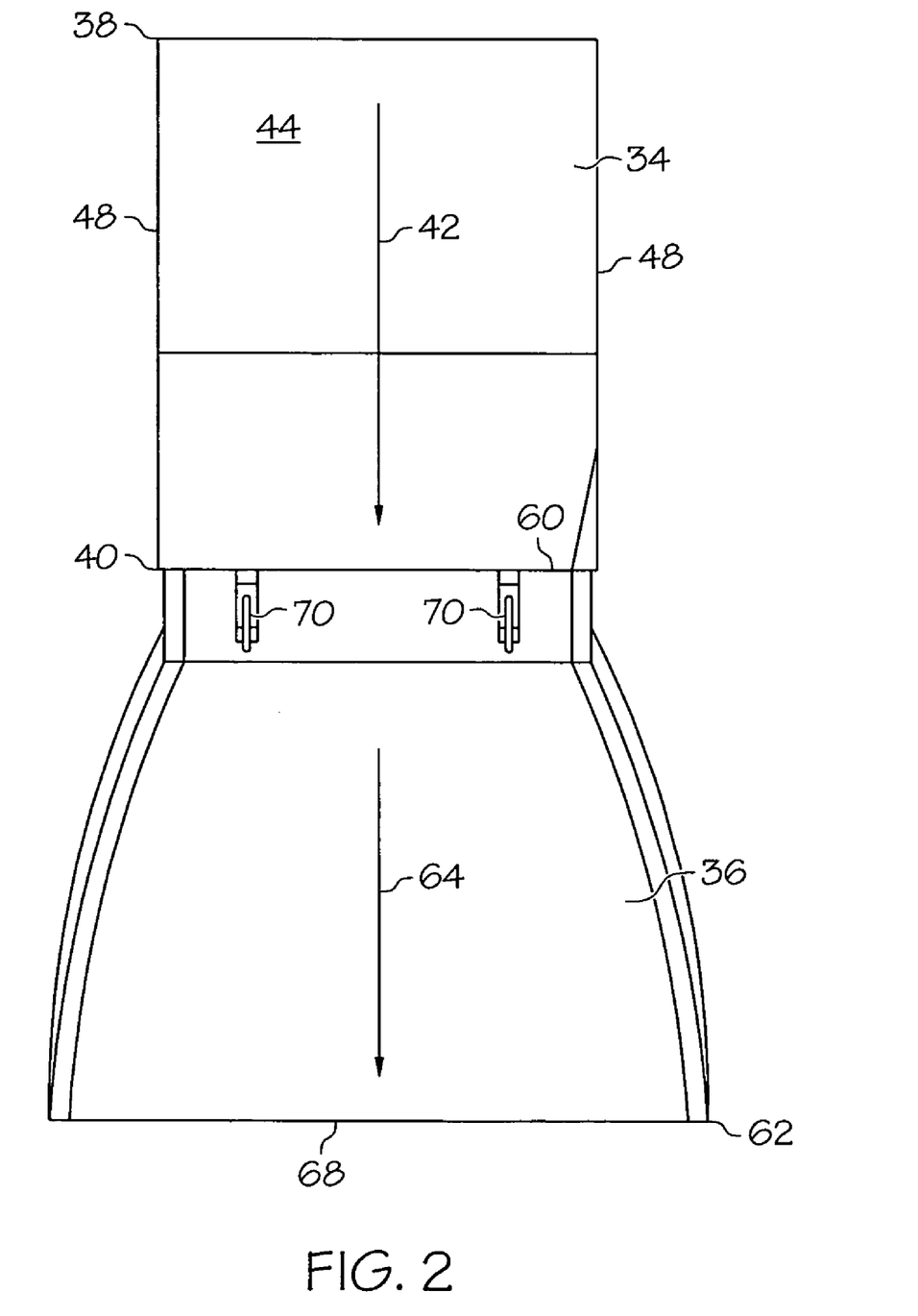
FIG. 2 is a top view of one embodiment of an inlet door assembly.
Figure 3:
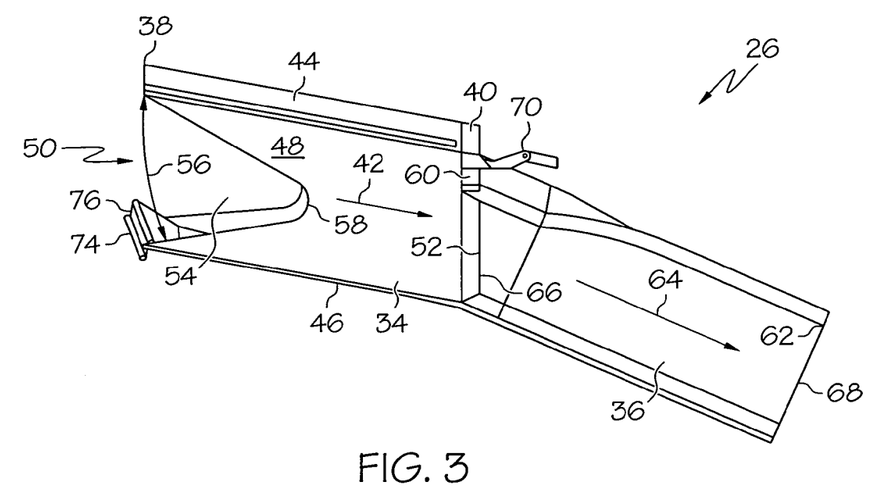
FIG. 3 is a perspective side view of the exemplary inlet door assembly of FIG. 2.

Turning now to FIGS. 2 and 3, a more detailed description of a preferred embodiment of the inlet door assembly 26 will be provided. As depicted therein, the inlet door assembly 26 preferably includes a duct 34 and a diffuser 36. The duct 34 includes an upstream end 38, a downstream end 40, and a duct flow passage 42 extending therebetween through which the external air 24 flows. In the depicted embodiment, and as shown most clearly in FIG. 3, the duct flow passage 42 is defined by an outer wall 44, an inner wall 46, and two side walls 48. It will be appreciated that the outer wall 44, the inner wall 46, and the side walls 48 may be integrally formed to define the duct flow passage 42, or may be separately formed and then coupled together. In either case, it is seen that the duct upstream end 38 has a duct inlet 50 formed therein, and the duct downstream end 40 has a duct outlet 52 formed therein. As may be appreciated, external air 24 enters the duct flow passage 42 via the duct inlet 50, and exits the duct flow passage 42 via the duct outlet 52.

The duct inlet 50 is preferably configured to allow the external air 24 to enter the duct flow passage 42 from a number of different angles. More specifically, the duct inlet 50 is defined in part by a space between upstream ends of the outer and inner walls 44, 46, and additionally by gaps 54 that are formed in each of the side walls 48. In the depicted embodiment each gap 54 has a wedge-like shape that decreases in cross section along its respective sidewall from a maximum cross section 56 to an apex 58. However, this particular shape and configuration, is merely exemplary, and the gaps 54 could be implemented according to any one of numerous shapes and configurations. Each gap 54 is preferably configured such that its maximum cross section 56 is disposed proximate the duct upstream end 38, and the gap apex 58 is disposed at a predetermined distance downstream of the duct upstream end 38. It will be appreciated that the specific location of the gap apex 58 may vary, but in a particular preferred embodiment it is located about half-way between the duct upstream and downstream ends 38, 40. It will additionally be appreciated that the flow area of the gap maximum cross section 56, and the overall cross sectional flow area of each gap 54 may vary depending, for example, on the desired flow characteristics to be achieved. No matter the specific shape and configuration of the gaps 54, the external air 24 that enters the duct flow passage 42 via the duct inlet 50 and gaps 54, flows through the duct flow passage 42, out the duct outlet 52, and into the diffuser 36.

The diffuser 36 is coupled to the duct 34 and, similar to the duct 34, includes at least an upstream end 60, a downstream end 62, and a diffuser flow passage 64 extending therebetween that has an inlet 66 and an outlet 68. In a preferred embodiment, the diffuser 36 is rigidly coupled to the duct 34. It will nonetheless be appreciated that the diffuser 36 could be coupled to the duct 34 in any one of numerous non-rigid configurations, so long as the diffuser 36 is movable with the duct 34. The diffuser inlet 66 is formed in the diffuser upstream end 60 and is in fluid communication with the duct outlet 52. Thus, as was alluded to above, the external air 24 that flows out the duct outlet 52, flows through the diffuser inlet 66, and into the diffuser flow passage 64.

The diffuser flow passage 64 is configured to rapidly diffuse the external air 24 as it flows therethrough, thereby rapidly reducing the velocity of the external air 24. Although the diffuser flow passage 64 may be implemented according to any one of numerous configurations to provide this functionality, in the depicted embodiment the diffuser flow passage 64 rapidly increases in cross-sectional flow area between the inlet 66 and the outlet 68. As is generally known, rapidly reducing the velocity of the external air 24 in this manner increases its pressure. Preferably, the diffuser flow passage 64 is configured to rapidly reduce the velocity of the external air 24 to near zero thus reducing the dump loss into plenum 28. As a result, when the external air 24 flows out the diffuser outlet 68 and into the plenum 28, its pressure is significantly increased to a more desirable level for APU 20 operation. It is further noted that, in addition to providing pressure recovery, the reduced velocity also reduces flow noise, and may additionally inhibit foreign objects and debris from entering the APU 20.

As was previously noted, the inlet door assembly 26 is coupled to the aircraft fuselage 12, and is movable between an open position and a closed position. Thus, as FIGS. 2 and 3 also depict, a pair of hinges 70 are coupled to the duct outer wall 44. The hinges 70 are used to rotationally couple the inlet door assembly 26 to the aircraft fuselage 12. It will be appreciated that the use of the hinges 70 is merely exemplary, and that other devices that would allow movement of the inlet door assembly between an open and a closed position could also be used. Moreover, although the hinges 70 are depicted as being coupled to the duct outer wall 44, it will be appreciated that the hinges 70 (or other equivalent devices) could be coupled to other portions of the inlet door assembly 26, such as the diffuser 36, in addition to or instead of the duct outer wall 44.

Preferably, the inlet door assembly 26 rotates, or otherwise moves, between the closed and open positions as a single unit, with the duct 34 and the diffuser 36 moving together. However, it will be appreciated that the duct 34 and the diffuser 36 can also be configured to move with partial or complete independence from one another. It will also be appreciated that the inlet door assembly 26, or components thereof, can move between the closed and open positions via other forms of movement such as sliding.

Figure 4:
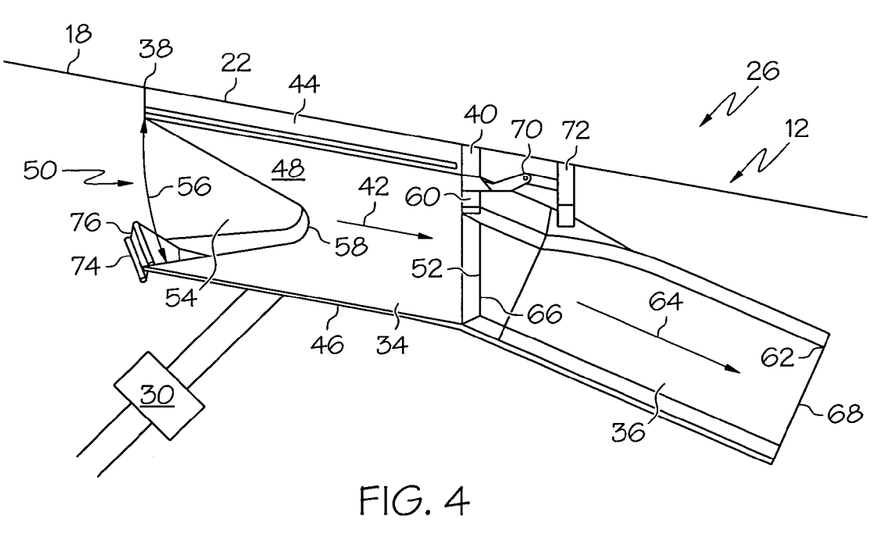
FIG. 4 is a perspective side view of the exemplary inlet door assembly of FIGS. 2 and 3, shown coupled to the aircraft fuselage and in a closed position.
Figure 5:
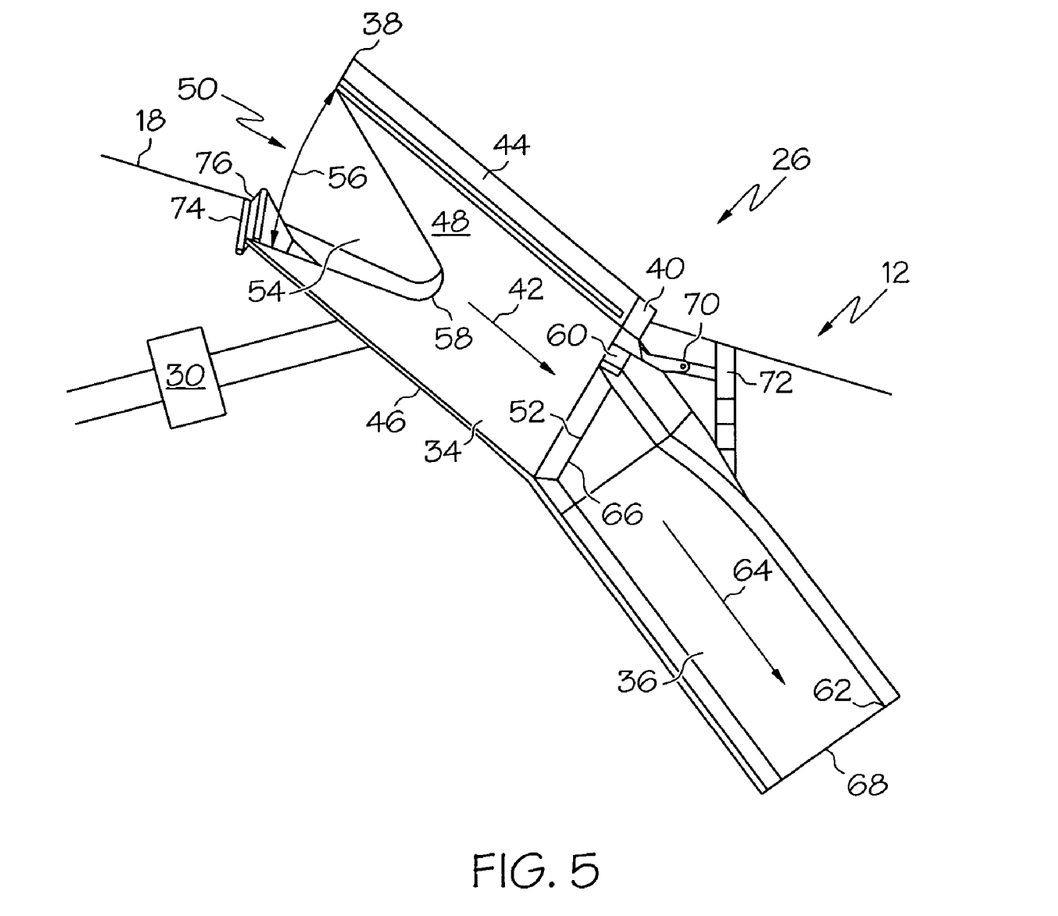
FIG. 5 is a side perspective view of the exemplary inlet door assembly of FIGS. 2 and 3, shown coupled to the aircraft fuselage and in the open position.

Turning now to FIG. 4, the inlet door assembly 26 is depicted coupled to the aircraft fuselage 12 via an existing strut 72, and in the closed position. As shown therein, when the inlet door assembly 26 is in the closed position, the duct outer wall 44 seals the intake opening 22 and prevents the external air 24 from entering the duct flow passage 42. In addition, to minimize aerodynamic drag, the duct outer wall 44 is preferably configured to be substantially flush with the remainder of the aircraft fuselage 12 when the inlet door assembly 26 is in the closed position. Conversely, and as depicted in FIG. 5, when the inlet door assembly 26 is moved to the open position, the external air 24 flows into and through the duct flow passage 42.

It is noted that when the inlet door assembly 26 is in the open position, fluids and boundary layer air that travel along the outer surface of the aircraft fuselage 12 could potentially enter the duct flow passage 42. These fluids, if allowed to enter the duct flow passage 42, could adversely affect the inlet door assembly 26 and/or other components of the aircraft fuselage 12. The boundary layer air, if allowed to enter the duct flow passage 42, could adversely impact APU 20 performance. To prevent, or at least alleviate these potentially deleterious effects, the inlet door assembly 26 includes a seal 74 and a flow diverter 76. The seal 74 is coupled to the duct inner wall 46 and, as shown most clearly in FIG. 5, seats against an inner surface of the aircraft fuselage 12 when the inlet door assembly is in the open position, and facilitates the flow of the external air 24 into the duct flow passage 42 by minimizing loss of the external air 24. The seal 74 is preferably configured to match the contour of the intake opening 22, so that the seal 74 is substantially flush with the portion of the aircraft fuselage 12 immediately surrounding the intake opening 22 when the inlet door assembly 26 is in the open position.

The flow diverter 76 is also preferably coupled to the duct inner wall 46, and extends above the exterior surface 18 of the fuselage 12 when the inlet door assembly 26 is in the open position. The flow diverter 76 diverts the above mentioned fluids away from the duct inlet 50, and prevents the boundary layer air from entering the duct flow passage 42. It will be appreciated that in certain embodiments the seal 74 and/or the flow diverter 76 may not be necessary, or may take any number of different forms.

It will be appreciated that the inlet door assembly 26 could be moved between the closed and open positions using any number of means known in the art including, for example, a crank or a shaft. Preferably, however, and as FIGS. 4 and 5 additionally show, the inlet door assembly 26 is moved via an actuator assembly 30. The actuator assembly 30 may be implemented using any one of numerous types of electrical, electromechanical, hydraulic, or pneumatic actuators, and may be coupled to the inlet door assembly 26 at any one of numerous locations. Preferably, however, the actuator assembly 30 is coupled to a location such that the actuator is not within the flow path of the external air 24 through the inlet door assembly 26. In the depicted embodiment, the actuator assembly 30 is coupled to the duct inner wall 46.

The depicted embodiment provides substantial flexibility and other advantages for use in the design and configuration of the aircraft fuselage 12. For example, the use of the plenum 28 and the diffuser 36 enables the inlet door assembly 26 to be disposed at any one of numerous locations along the tailcone section 10 of the aircraft fuselage 12. This configuration also allows for greater flexibility in the placement of the APU 20 in the compartment 14. For example, the APU 20 can be placed upstream or downstream of the inlet door assembly 26.

This flexibility also allows for the inlet door assembly 26, the plenum 28, the APU 20, and/or any portions or combinations thereof, to be made or defined in whole or in part by composite, tailcone or other existing structural material from the aircraft fuselage 12. For example, the APU 20 can be mounted adjacent to the inlet door assembly 26, thereby allowing the APU 20 and the inlet door assembly 26 to share common material from the aircraft fuselage 12. This provides additional advantages, for example by decreasing the space and weight taken up by these components, decreasing the cost of materials, and providing additional flexibility for the configuration of the compartment 14 and the aircraft fuselage 12. The plenum 28, the duct 34, the diffuser 36, the APU 20, and/or any other components, or any portions thereof, can similarly share common walls or other material, providing additional flexibility and other advantages. It will be appreciated that these components can also take any number of other shapes and configurations in other embodiments, providing corresponding flexibility and/or other advantages.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inlet door assembly for an aircraft, the inlet door assembly comprising:
a duct having a flow passage extending therethrough, the duct configured to be movably coupled to the aircraft and to move between an open position, in which air external to the aircraft flows through the duct flow passage, and a closed position, in which air external to the aircraft does not flow through the duct flow passage; and
a diffuser coupled to the duct and configured to move with the duct, the diffuser having a flow passage extending therethrough that is in fluid communication with the duct flow passage and configured to diffuse the air that flows therethrough, wherein the duct and the diffuser are formed as one piece.

2. The assembly of claim 1, wherein the diffuser and the duct are configured to move as a single unit.

3. The assembly of claim 1, wherein the duct is rotationally mounted on the aircraft.

4. The assembly of claim 1, further comprising one or more actuator assemblies configured to move the duct between the open position and the closed position.

5. The assembly of claim 1, wherein the duct comprises:
an outer wall;
an inner wall; and
two side walls, each side wall coupled to the outer wall and the inner wall and spaced apart from each other to define the duct flow passage.

6. The assembly of claim 5 further comprising a diverter coupled to the inner wall, the diverter configured to extend beyond an exterior surface of the aircraft in order to at least inhibit fluids and aircraft boundary air from entering the duct flow passage.

7. The assembly of claim 5, wherein the duct further comprises:
an upstream end;
a downstream end; and
a duct inlet for allowing air external to the aircraft to flow into the duct flow passage through multiple angles when the duct is in the open position.

8. The assembly of claim 7, wherein the duct inlet comprises:
a space between the outer wall and the inner wall at the upstream end of the duct; and
one or more gaps formed in the side walls.

9. The assembly of claim 7 further comprising a seal coupled to the inner wall proximate the duct upstream end.

10. An inlet door assembly for an aircraft, the inlet door assembly comprising:

a duct having a flow passage extending therethrough, the duct configured to be movably coupled to the aircraft and to move between an open position, in which air external to the aircraft flows through the duct flow passage, and a closed position, in which air external to the aircraft does not flow through the duct flow passage;

a diffuser coupled to the duct and configured to move with the duct, the diffuser having a flow passage extending therethrough that is in fluid communication with the duct flow passage and configured to diffuse the air that flows therethrough, wherein the duct and the diffuser are formed as one piece; and a plenum in fluid communication with the diffuser flow passage to receive air therefrom.

11. The assembly of claim 10, wherein the duct is rotationally mounted on the aircraft.

12. The assembly of claim 10, further comprising one or more actuator assemblies configured to move the duct between the open position and the closed position.

13. The assembly of claim 10, wherein the duct comprises:
an outer wall;
an inner wall; and
two side walls, each side wall coupled to the outer wall and the inner wall and spaced apart from each other to define the duct flow passage.

14. The inlet door assembly of claim 13 further comprising a diverter coupled to the inner wall, the diverter configured to extend beyond an exterior surface of the aircraft in order to at least inhibit fluids and aircraft boundary air from entering the duct flow passage.

15. The assembly of claim 13, wherein the duct further comprises:
an upstream end;
a downstream end; and
a duct inlet for allowing air external to the aircraft to flow into the duct flow passage through multiple angles when the duct is in the open position.

16. The assembly of claim 15, wherein the duct inlet comprises:

a space between the outer wall and the inner wall at the upstream end of the duct; and
one or more gaps formed in the side walls.

17. The assembly of claim 15 further comprising a seal coupled to the inner wall proximate the duct upstream end.

18. An inlet door assembly for an aircraft, the inlet door assembly comprising:

a duct having a flow passage extending therethrough, the duct configured to be movably coupled to the aircraft and to move between an open position, wherein air external to the aircraft flows through the duct flow passage, and a closed position, wherein air external to the aircraft does not flow through the duct flow passage;

a diffuser coupled to the duct and configured to move with the duct, the diffuser having a flow passage extending therethrough that is in fluid communication with the duct flow passage and configured to diffuse the air that flows therethrough, wherein the duct and the diffuser are formed as one piece;

a plenum in fluid communication with the diffuser flow passage to receive air therefrom; and an APU in fluid communication with the plenum to receive air therefrom.

19. The assembly of claim 18, further comprising one or more actuator assemblies configured to move the duct between the open position and the closed position.

20. The assembly of claim 18, further comprising an APU inlet duct coupled between the plenum and the APU, through which the APU receives air from the plenum.

21. The assembly of claim 18 wherein the plenum is configured to receive cooling air, the assembly further comprising:
an APU compartment for housing the APU; and
an APU compartment cooling inlet duct between the plenum and the APU compartment, through which the APU compartment receives the cooling air from the plenum.

* * * * *

UNITED STATES PATENT AND TRADEMARK OFFICE
CERTIFICATE OF CORRECTION

PATENT NO.        : 7,600,714 B2                              Page 1 of 1
APPLICATION NO. : 11/409360
DATED             : October 13, 2009
INVENTOR(S)       : Sheoran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this

Fifth Day of October, 2010

David J. Kappos
*Director of the United States Patent and Trademark Office*